US012035866B2

(12) United States Patent
Lölsberg

(10) Patent No.: US 12,035,866 B2
(45) Date of Patent: Jul. 16, 2024

(54) CLEANING DEVICE FOR VESSELS

(71) Applicant: Bernd Lölsberg, Kürnach (DE)

(72) Inventor: Bernd Lölsberg, Kürnach (DE)

(*) Notice: Subject to any disclaimer, the term of this patent is extended or adjusted under 35 U.S.C. 154(b) by 0 days.

(21) Appl. No.: 17/944,241

(22) Filed: Sep. 14, 2022

(65) Prior Publication Data

US 2023/0086997 A1 Mar. 23, 2023

(30) Foreign Application Priority Data

Sep. 17, 2021 (DE) ..................... 10 2021 124 124.3

(51) Int. Cl.

| | |
|---|---|
| ***A47L 15/00*** | (2006.01) |
| ***A47L 15/42*** | (2006.01) |
| ***B08B 9/08*** | (2006.01) |
| ***B08B 9/093*** | (2006.01) |

(52) U.S. Cl.

CPC ......... *A47L 15/0065* (2013.01); *A47L 15/421* (2013.01); *A47L 15/4217* (2013.01); *A47L 15/4248* (2013.01); *B08B 9/0813* (2013.01); *B08B 9/093* (2013.01); *B08B 2209/08* (2013.01)

(58) Field of Classification Search

None

See application file for complete search history.

(56) References Cited

FOREIGN PATENT DOCUMENTS

DE 202005015103 U1 2/2006

OTHER PUBLICATIONS

Loelsberg, "DE202005015103U1 English Machine Translation. pdf", Feb. 9, 2006—Machine translation from Espacenet.com.*

* cited by examiner

*Primary Examiner* — Levon J Shahinian

(74) *Attorney, Agent, or Firm* — Dickinson Wright PLLC; Andrew D. Dorisio

(57) ABSTRACT

A cleaning device for a vessel includes a base body, a valve, a spray body, a restoring device, a release mechanism and an actuating element. The base body includes a connector, the valve is disposed between the base body and the spray body and the valve is operable by the release mechanism against a restoring force applied by the restoring device, the actuating element being disposed on the release mechanism and the actuating element includes at least one leg forming a supporting surface for a vessel and the spray body includes a spray head disposed above and at a distance from the supporting surface, the restoring force being greater than the sum of the gravitational forces of the vessel, the release mechanism and the actuating element.

16 Claims, 2 Drawing Sheets

CLEANING DEVICE FOR VESSELS

TECHNICAL FIELD

The present invention relates to a cleaning device for vessels.

BACKGROUND

For example, washing or rinsing devices for vessels, in particular glasses, cups or the like, in which a valve on the inside is opened by applying pressure to the upper surface of the rinsing device, such that cleaning liquid is sprayed into the vessel and cleans said vessel, are known from the state of the art. The valve is only opened if the user applies additional pressure to the vessel. This system is in particular disadvantageous in that larger vessels are very difficult to clean with this system. Additionally, with mixing beakers that have blades at their bottom or vessels with other components at their bottom, the cleaning device is at risk of being damaged. Simultaneously, the blades of the mixing beaker can also be damaged.

Furthermore, in the state of the art, cleaning systems are known in which the cleaning nozzles are disposed on a moveable plate, a valve being opened by means of displacing the moveable plate by pressure for introducing cleaning liquid if a vessel is placed thereon and pressed down. This design is disadvantageous in that, in particular with large vessels, the water from the nozzle must be shot upwards under high pressure in order to reach the bottom of the vessel. This results in either a poor cleaning performance because of insufficient water pressure or a large amount of water being required for the cleaning process.

In addition to the systems mentioned above, cleaning devices are known which are activated just by the weight of the vessel and which spray cleaning liquid into the inside of the vessel. This is disadvantageous in that these cleaning devices can be activated unintentionally and uncontrolledly.

As a consequence, there is high demand for an adjustable and well manageable cleaning device which thoroughly and reliably cleans vessels irrespective of their shape and size. In addition, the cleaning device should be inexpensive to produce, durable and suitable for a plurality of different vessels and should also be designed as compact as possible so as to save space and water. Another focus is the durability and the simple operation of the cleaning device. It is therefore the object of the invention to provide a cleaning device in order to overcome the difficulties described above and especially to ensure reliable cleaning of a plurality of different vessels with minimum space and water requirements.

SUMMARY

This object is attained in a surprisingly simple but effective manner by a cleaning device according to this disclosure.

According to the invention, a cleaning device for a vessel is proposed, the cleaning device comprising a base body, a valve, a spray body, a restoring device, a release mechanism and at least one, preferably two, three, four, five, six, seven, eight, nine, ten or more identical or different actuating elements. The base body comprises a connector, and a valve is disposed between the spray body and the base body. The valve can be opened by the release mechanism, a restoring force being applied to the release mechanism by means of the restoring device. The actuating element, which comprises at least one leg, is disposed on the release mechanism. The leg of the actuating element forms a supporting surface for a vessel. The spray body comprises a spray head, the spray head being disposed above the supporting surface and at a distance from the supporting surface. The cleaning device is characterized in that the restoring force applied to the release mechanism by the restoring device is greater than the sum of the gravitational forces of the vessel, the release mechanism and the actuating element.

In the present invention, it has been discovered that if the restoring force is greater than the sum of the gravitational forces of the vessel, the release mechanism and the actuating element, it is not possible to open the valve by simply placing the vessel onto the actuating element. Thus, additional force is required for opening the valve, which enables the cleaning function of the cleaning device. For example, this additional force can be generated by the user of the cleaning device by pressing down the vessel. When the user releases the vessel, the valve is closed by the restoring force applied by the restoring device because, according to the invention, the restoring force is greater than the sum of the gravitational forces of the vessel, the release mechanism and the actuating element. It is obvious to a person skilled in the art that any elements that may be additionally attached to the cleaning device and whose weight partly or fully acts on the restoring device must be considered when choosing the strength of the restoring force by correspondingly increasing the restoring force. Likewise, the pressure of the cleaning liquid must be considered for the configuration the restoring force, if necessary. The additionally required force rules out an accidental and thus uncontrolled triggering of the cleaning function. Thus, the cleaned vessel can remain on the cleaning device to dry, dry off, drip off and/or to store this vessel.

The base body made of a material according to the requirements is designed such that it is suitable for conducting cleaning liquid from the connector to the valve. In particular, this is achieved by a hollow body. At the connector, a cleaning liquid which has already been pressurized is applied by suitable means known to the person skilled in the art. For example, the cleaning liquid can be introduced by connecting a suitable medium, such as a tube, which is connected to a (public) water supply system. A valve according to the requirements is disposed on the base body so that the cleaning liquid does not constantly and uncontrolledly flow through the cleaning device. The valve can be disposed partly or fully inside the base body. According to the invention, the valve is required to be able to prevent the cleaning liquid from flowing from the base body to the spray body or to allow the cleaning liquid to flow from the base body to the spray body. A valve is a component known to the person skilled in the art which can be opened and closed. In the open state, the cleaning liquid is conducted from the base body through the valve to the spray body. The cleaning liquid is conducted because of the pressure it is under. In the closed state, the cleaning liquid is stopped, so that the cleaning liquid is unable to flow through the valve. The spray body is designed such that it can conduct the cleaning liquid to the spray head, the spray head distributing the cleaning liquid inside the vessel. For this purpose, the spray body is preferably hollow. At the same time, the release mechanism is guided through the spray body, so that the release mechanism establishes the force-transmitting connection between the valve and the actuating element and the valve can be opened by means of the release mechanism. The configuration of the release mechanism is adjusted to the configuration of the valve; the configuration must ensure that a movement of the release mechanism towards the supporting surface causes an opening of the valve, according to the invention. The closing of the valve is caused by the restoring device which is also comprised by the cleaning device. For this purpose, the restoring device itself is preferably elastically deformable or a part or parts of the restoring device is/are elastically deformable. A force is required to cause the elastic deformation. The degree of deformation is directly linked to the force. The deformation to be caused generates the restoring force which closes the valve if the force acting on the restoring device decreases or is too small. The restoring device can be disposed in the spray body and/or in the base body. When the valve is open, the liquid flows from the base body through the valve into the spray body, which distributes the cleaning liquid inside the vessel by means of the spray head. The actuating element is disposed on the release mechanism. Preferably, the actuating element is detachably connected to the release mechanism. This allows, for example, to easily replace and/or clean the actuating element and to partly or fully disassemble the cleaning device. Possible detachable connections are described elsewhere. This preferred embodiment also allows the vessel to be stored on the actuating element and together with the actuating element in a simplified manner. The actuating element is configured such that the vessel can be placed on the actuating element. For this purpose, the actuating element has at least one leg which forms any arbitrary supporting surface for the vessel. The vessel is placed on the supporting surface, such that the spray head, which is disposed at a distance to the supporting surface above the supporting surface, is inside the vessel when the vessel is placed on the supporting surface. For this purpose, the vessel edge of the vessel rests on the supporting surface of the leg. The supporting surface can generally have any configuration, it can be parallel or at a slant to the surface on which the cleaning device is placed. Furthermore, it is conceivable that the supporting surface is distributed to several points of the leg, so that the edge of the vessel abuts against several parts of the leg. Preferably, the cleaning device can be partly or fully disassembled to facilitate and/or allow the cleaning device to be serviced, cleaned, repaired and/or adjusted.

The cleaning function or the cleaning process of the cleaning device is achieved by a cleaning liquid, for example, water or water with an added cleaning agent and/or disinfectant, being sprayed through the spray head into the inside of the vessel. In the present invention, it has been discovered that for cleaning the vessel efficiently and in a water-saving manner, the spray body is to be placed in the vessel at a point which is as high as possible but at a distance from the vessel bottom and from any components disposed at the vessel bottom, such as the blades of a mixer. In this manner, the cleaning liquid can be applied evenly and comprehensively to the vessel walls and the vessel bottom or can run down therefrom. Thus, the vessel is reliably cleaned while preventing damages to the spraying device and/or the vessel and while reducing the amount of used cleaning liquid. Such a position of the spray body can be achieved by resting the vessel on the supporting surface and the spray body being disposed above said supporting surface. Subsequently, the cleaning process can be interrupted or completed. The configuration of the supporting surface can improve the footing of the vessel and/or the stability of the cleaning device. The supporting surface extending parallel to the surface on which the cleaning device rests allows a plurality of vessels with different openings to be positioned safely. The slanted arrangement, in particular if the individual supporting surfaces of the leg can be imagined as a truncated cone, allows vessels with a round opening to be aligned automatically. By placing the vessel on the leg, the gravitational force of the vessel is transmitted to the release mechanism and thus acts against the restoring force which is applied to the release mechanism by the restoring device.

In order to ensure that the spray body does not continuously spray water, the cleaning device comprises the valve which regulates the flow of the cleaning liquid. The spray body cannot be supplied with cleaning liquid unless the valve is open. It is essential to the invention that the valve does not open when the vessel is placed on the supporting surface and no other forces are applied to the valve. This gives the user control over the cleaning process. To cause this effect, the cleaning device comprises the restoring device which applies a restoring force to the valve. It is essential to the invention that the restoring force is greater than the sum of the gravitational forces of the vessel, the release mechanism and the actuating element. In this manner, the valve is not opened by the dead load of the vessel alone. Only if the user applies additional force to the actuating element, for example by pressing down, the valve opens and the cleaning liquid is conducted to the spray body. To supply the cleaning process with the required cleaning liquid, a connector is required through which the cleaning liquid is supplied to the cleaning device. According to the invention, this connector is housed in the base body on which the valve is disposed. At the same time, the base body provides the cleaning device with the necessary stability. First of all, to induce the cleaning process according to the invention, the vessel is placed on the actuating element, the vessel edge coming to rest on the supporting surface. The spray body is now inside the vessel.

Subsequently, an additional force, which overcomes the restoring force of the restoring device, is applied to the actuating element and is transmitted to the valve via the release mechanism. As a result of this, the valve opens and conducts the cleaning liquid via the connector through the base body, through the valve to the spray body and from there to the spray head, the cleaning liquid exiting the spray head under pressure and being distributed inside the vessel. The cleaning liquid absorbs dirt and other unwanted substances from the inside of the vessel and flows down to the vessel edge where it flows out of the vessel together with the dirt and the other unwanted substances. When the additionally applied force is removed from the actuating element, the restoring force applied by the release mechanism closes the valve, the cleaning liquid is prevented from flowing and the cleaning process is finished.

The term “openable” relates to the valve being able to switch from the closed state to the open state and to allow the flow of the cleaning liquid for the cleaning process. The term “closeable” relates to the valve being able to switch from the open state to the closed state and to prevent the flow of cleaning liquid.

The invention provides a cleaning device which is durable, robust and easy to use and which is water-saving while also having a good cleaning performance. A plurality of vessels, in particular vessels with components such as knifes, blades, and the like at the bottom, can be cleaned simply, safely and quickly without damaging the cleaning device. Furthermore, the invention allows vessels to be placed down quickly and safely, in particular after the cleaning, to dry, drip off and/or to dry off and/or to store the vessel in a compact manner, thereby also increasing the storage space simultaneously.

Advantageous embodiments of the invention, which can be realized on their own or in combination, are described in the dependent claims.

It is conceivable that the restoring force applied by the restoring device is adjustable. In this manner, the cleaning device can be used for vessels with different weights. The adjustment is preferably stepless. More preferably, the adjustment of the restoring force is carried out manually and/or automatically. Methods for providing the adjustability are known to the person skilled in the art.

In an embodiment of the invention, it is conceivable that the restoring device comprises at least one spring. Preferably, it comprises two, three, four, five, six, seven, eight, nine, ten or more identical or different springs. In general, the restoring device can generate the restoring force in any way. Springs are inexpensive, easy to handle and durable components and are suitable for generating the restoring force according to the invention. It is also conceivable that the restoring force is generated by a body made of an elastic material, for example, a torus, in particular a hollow torus. It is obvious to the person skilled in the art that the hardness grade and/or the size of the spring or the elastic body must be designed for the use according to the invention.

Furthermore, it is conceivable that the spray head comprises openings, the opening having a spraying direction and the spraying direction being oriented so as to be vertically, horizontally or at a slant between vertical and horizontal. Preferably, the spray body comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more identical or different openings. More preferably, the openings are evenly distributed on the spray head, such that the cleaning liquid is distributed in all circumferential directions, in particular in the horizontal plane. In the present invention, it has been discovered that vertically oriented openings are particularly suitable for cleaning the bottom of the vessel. Horizontally oriented openings, on the other hand, are suitable for cleaning the side walls of the vessel. Openings with a slanted spraying direction are particularly suitable for cleaning circular vessels. Additionally, it is conceivable that openings are disposed on the spray body for enhancing the cleaning function. According to the invention, these openings are also disposed above the supporting surface. Openings can be created easily and inexpensively, for example, by drilling. It is also conceivable that a nozzle is disposed in the opening for enhancing the cleaning effect.

The term "horizontal" relates to a surface which is parallel to the surface on which the cleaning device is placed. The term "vertical" relates to a direction which is perpendicular to the surface on which the cleaning device is placed.

Furthermore, it is conceivable that the cleaning device comprises at least two identical and/or different actuating elements, the actuating elements being detachably connectable to the release mechanism. Preferably, the cleaning device comprises three, four, five, six, seven, eight, nine, ten or more identical or different actuating elements. In this manner, specially adjusted actuating elements can be provided for different vessels and/or a separate suitable actuating element can be provided for several identical vessels. Via the detachable connection, the cleaning device can be adjusted to the different vessels. Furthermore, the vessel can remain on the actuating element after the cleaning process, in particular to dry, drip off, dry off and/or to store said vessel. Irrespective of the configuration of the vessel, the vessel is thus not only provided with an ideal cleaning effect, but the storage space is also increased. The configuration of the detachable connection can generally have any design; preferably, it is a plug connection, screw connection or click connection. However, a plurality of other connections is also conceivable.

In another embodiment of the invention, it is conceivable that the actuating element has a stabilizing element of any design which is preferably circular, angular or polygon. In the present invention, it has been discovered that in particular large vessels and/or irregularly shaped vessels cause a tilting and/or a twisting of the vessel and/or the actuating element with respect to the cleaning device when the vessel is placed on the actuating element in such a way that the center of gravity of the vessel is not or cannot be placed centrally above the cleaning device.

The tilting and/or twisting cause(s) an instability of the cleaning device, such that it can easily fall over. If the actuating element comprises a stabilizing element, the vessel and/or the actuating element is/are prevented from tilting or twisting.

In a preferred embodiment, the stabilizing element is annular. In this case, the annular stabilizing element fully surrounds the cleaning device, preferably the base body and/or the spray body and is in preferably form-fitting contact with it. The form fit prevents a tilting and/or twisting of the actuating element in a simple but effective manner.

Furthermore, it is conceivable that the leg of the actuating element comprises a rubber coating or another suitable coating, such as a plastic coating. Preferably, the rubber coating is located on the supporting surface. In the present invention, it has been discovered that the vessel can be fragile and/or sensitive. To prevent the vessel from being damaged, it is advantageous if the edge of the vessel rests on a resilient surface. Such a resilience can be provided by a rubber coating or the coating. Furthermore, it is advantageous that rubber coatings or the coating cause higher friction with respect to the vessel. In this manner, a shift is prevented which can also cause damage to the vessel or an instability of the cleaning device.

In another embodiment of the invention, it is conceivable that the leg of the actuating element is oblong, at least partially curved, at least partially straight, round and/or flat. In general, the leg can have any design as long as it is suitable for the application according to the invention. For the application according to the invention, the leg is in particular suitable if it provides a supporting surface for the vessel, if necessary, in cooperation with additional legs, such that the vessel can be placed safely on the actuating element while simultaneously the distance of the spray head to the supporting surface according to the invention is ensured. A round configuration of the leg allows a tension-free placement of the vessel whereas a flat configuration enlarges the supporting surface and thus distributes the pressure acting on the vessel more evenly. By means of the at least partially straight and/or curved configuration, it is possible to distance the spray head from the supporting surface according to the invention.

Furthermore, it is conceivable that the leg of the actuating element has at least one, preferably two, three, four, five, six, seven, eight, nine, ten or more identical or different elevations and/or at least one recess. When the edge of the vessel comes into contact with the recess or the elevation, the vessel is effectively prevented from sliding down and/or shifting further and the stability of the cleaning device is increased. At the same time, placing the center of gravity of the vessel centrally above the cleaning device and thus increasing the stability of the cleaning device is facilitated.

It is conceivable that the actuating element comprises two to ten identical or different legs. In general, any number of legs can be used. By using more than one leg, the actuating element can be produced using significantly less material and thus becomes lighter. At the same time, the total size of the supporting surface is increased and/or distributed to several places on the vessel edge in a simple manner. This decreases the load acting on the vessel and prevents an unstable placement of the vessel on the actuating element. Particularly preferably, the actuating element has 2, 3, 4, 5, 6, 7, 8, 9, 10, 11, 12, 13, 14, 15, 16, 17, 18, 19, 20, 21, 22, 23, 24, 25, 26, 27, 28, 29, 30 or more identical or different legs. Particularly preferably, the legs are distributed evenly on the circumferential edge of the vessel and/or are adjusted to it.

In an embodiment of the invention, it is also conceivable that the actuating element has a hub, the actuating element being connectable to the release mechanism by means of the hub and the hub preferably being made of a suitable metal or precious metal, such as chromium and/or stainless steel. Using a hub is a simple but effective way to connect the leg or the legs to the release mechanism by means of a connection housed in the hub. In the present invention, it has been discovered that the hub is exposed to particularly high stress because of the force transmission and/or the preferred replaceability of the actuating element which is described elsewhere. Furthermore, the legs are preferably also detachably connected to the hub. This facilitates repairing, replacing, and/or cleaning the actuating element and also partly or fully disassembling the cleaning device. Using hard, friction-resistant and water-resistant materials, such as chromium and/or stainless steel, provides a high durability for the hub.

Furthermore, it is conceivable that the base body and/or the spray body comprise(s) at least one, preferably two, three, four, five, six or more identical or different guide rails and that the actuating element is guidable in the guide rail. A guide rail ensures that the actuating element does not twist relative to the cleaning device. The disadvantages of such a twisting as described elsewhere.

Furthermore, it is conceivable that the cleaning device comprises a sealing device and/or a backflow preventer. The sealing device seals the base body of the cleaning device when the valve and/or the spray body is/are removed. Thus, it is possible to remove the spray body along with the valve, the restoring device, the release mechanism and/or the actuating element without having to disconnect the cleaning device from the source providing the cleaning liquid. This can take place for repairing, cleaning and/or retrofitting the cleaning device, for example. In particular, the restoring force of the restoring device can be adjusted by replacing one or several components. For example, a spring can be replaced by a harder or a softer spring. The backflow preventer prevents cleaning liquid from the cleaning device from flowing back through the connector.

The term "backflow preventer" relates to a component which is suitable for allowing liquids to flow in only one flow direction. A flow of the liquid against the flow direction is blocked by the backflow preventer. Suitable components are known to the person skilled in the art.

In general, the cleaning device cleans any kind of vessel. Preferably, the vessel is a glass, in particular a drinking glass, a storage jar or a canning jar, a cup, a pitcher, a tumbler, a mixer container, a blender and/or a blender container, a liquidizer container, a shaker, a mixing bowl, a mixing beaker, a jug, a cookware, in particular a pot, a pan, a roasting pan, a baking sheet, a baking dish or a casserole; a vase, a bowl, a dish, a box, a barrel, a bottle or a funnel. Furthermore, at the bottom, the vessel preferably has one or more mixing device(s), cutting device(s), shredding device(s) and/or comminution device(s), such as knifes or blades.

In general, the vessel can be made of any material; preferably, it is made of glass, clay, ceramic, wood, bamboo, plant fibers, plastic, paper, cardboard, metal, in particular copper, iron, aluminum or brass; or steel, in particular stainless steel. A combination and/or a mixture of the aforementioned materials is also conceivable.

BRIEF DESCRIPTION OF THE DRAWINGS

Further details, features and advantages of the invention are apparent from the following description of preferred exemplary embodiments in connection with the dependent claims. The respective features can be realized on their own or as a combination of several features together. The invention is not limited to the described embodiments. The embodiments are shown schematically in the figures. Identical reference numbers in the individual figures refer to identical or functionally identical elements or elements which correspond to each other regarding their function.

DETAILED DESCRIPTION

Figure 1:
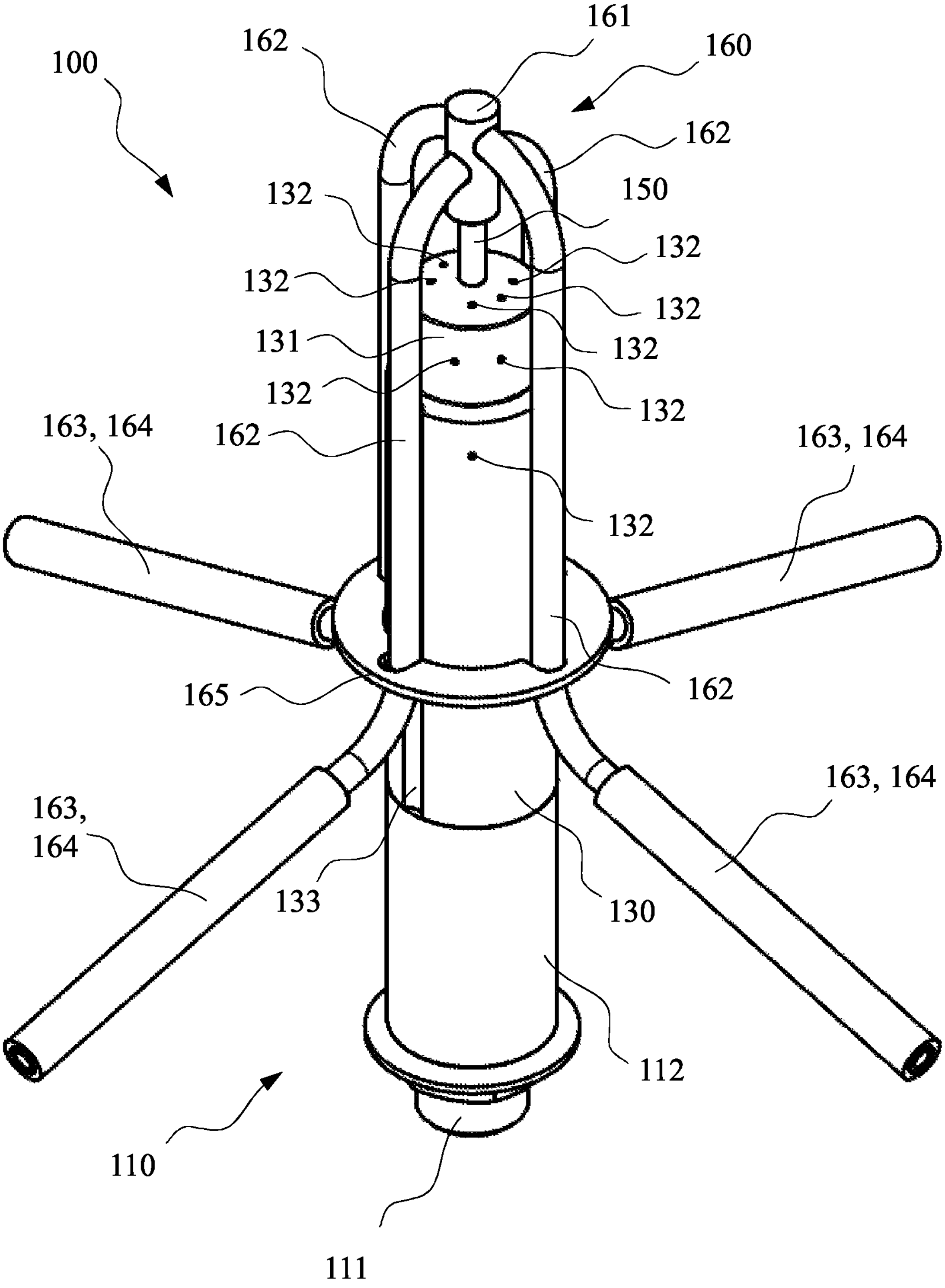
FIG. 1 shows an isometric view of a cleaning device according to the invention.

FIG. 1 shows a side view of a cleaning device 100 according to the invention. Cleaning device 100 comprises a base body 110 on which a connector 111 is disposed. Via connector 111, cleaning device 100 can be connected to a source providing a pressurized cleaning liquid. For conducting the cleaning liquid and for housing components (described elsewhere) of cleaning device 100, base body 110 comprises a housing 112. Furthermore, cleaning device 100 comprises a spray body 130 which is disposed above base body 110. Between base body 110 and spray body 130, a valve (not shown) is disposed. Spray body 130 comprises a spray head 131 on which a plurality of openings 132 is disposed. Via spray body 130, the cleaning liquid is conducted to spray head 131 and exits through openings 132.

Openings 132 are also disposed on the spray body. Furthermore, spray body 130 comprises two guide rails 133, only one of two visible guide rails 133 being visible in FIG. 1. An actuating element 160 is disposed in guide rail 133. Actuating element 160 comprises four legs 162. One of legs 162 is guided in guide rail 133. Thus, actuating element 130 is prevented from twisting with respect to cleaning device 100. Legs 162 are curved such that a supporting surface 163 is formed. Additionally, legs 162 are distributed evenly on the circumference of cleaning device 100. To protect the vessel, which rests on supporting surface 163, legs 162 have a rubber coating 164 in the area of supporting surface 163. Legs 162 intersect at a hub 161. Hub 161 connects actuating element 160 to a release mechanism 150. Release mechanism 150 is connected to the valve (not shown) so as to transmit force. It can be seen that spray head 131 and openings 132, which are disposed on spray body 130, are disposed above supporting surface 163.

Figure 2:
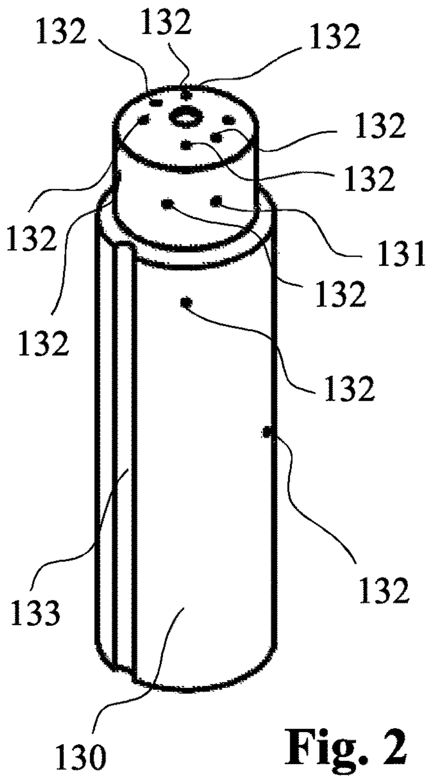
FIG. 2 shows an isometric view of a spray body according to the invention.

FIG. 2 shows an isometric view of spray body 130. A guide rail 133, which is visible in FIG. 2, is disposed on spray body 130. Spray body 130 comprises spray head 131. Six vertically oriented openings 132 and eight horizontally oriented openings 132 are disposed on spray head 131, only three of these eight horizontally oriented openings 132 being visible. Below spray head 131, spray body 130 comprises four additional openings 132 of which only two are shown and which are also oriented horizontally. Vertically oriented openings 132 spray the cleaning liquid in the vertical direction, in which the bottom of the vessel (not shown) is located according to the invention. Thus, they are particularly suitable for cleaning the bottom of the vessel. Horizontally oriented openings 132 spray the cleaning liquid in the horizontal direction, in which the side walls of the vessel (not shown) are located according to the implementation of the invention. Thus, they are particularly suitable for cleaning the side walls of the vessel.

Figure 3:
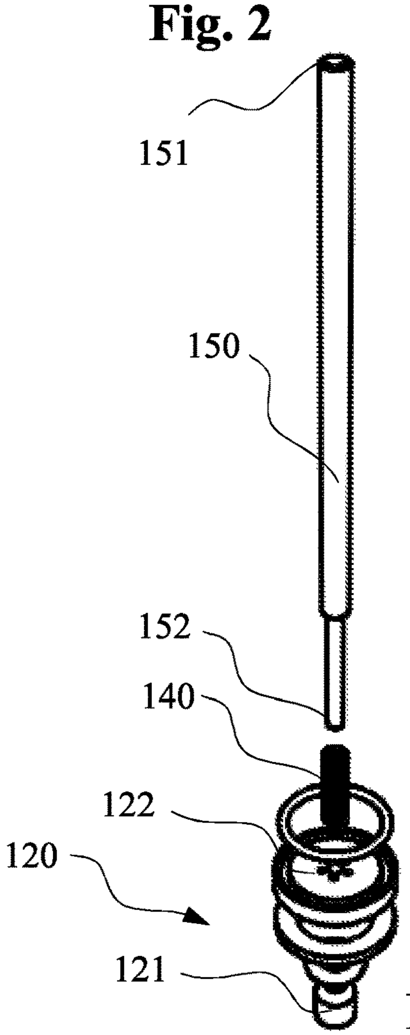
FIG. 3 shows an isometric exploded view of a release mechanism, a valve and a restoring device according to the invention.

FIG. 3 shows an isometric exploded view of release mechanism 150, a valve 120 and a restoring device 140. In this embodiment, release mechanism 150 is a rod, which extends through the spray body (not shown) and emerges at the upper surface of the spray head, as can be seen in FIG. 1. At the upper end 151 of the rod, the hub (not shown in FIG. 3) of the actuating element is disposed, as can also be seen in FIG. 1. Valve 120 is disposed at the lower end 152 which is opposite upper end 151 of release mechanism 150. The valve comprises a seal 121 and a passage 122. Seal 121 is connected to lower end 152 of release mechanism 150. If release mechanism 150 is moved vertically downward by a force, seal 121 opens passage 122 and the cleaning liquid can flow through valve 120 from the base body (not shown in FIG. 3) to the spray body. By a movement of release mechanism 150 vertically upwards, seal 121 closes passage 122 and stops the flow of the cleaning liquid. For this purpose, a restoring force is applied to valve 120 and release mechanism 150 by restoring device 140. Restoring device 140 is a spring in this embodiment. The restoring force moves release mechanism 150 vertically upwards and closes valve 120 if the restoring force is greater than the force acting on the actuating element (not shown in FIG. 3).

Figure 4:
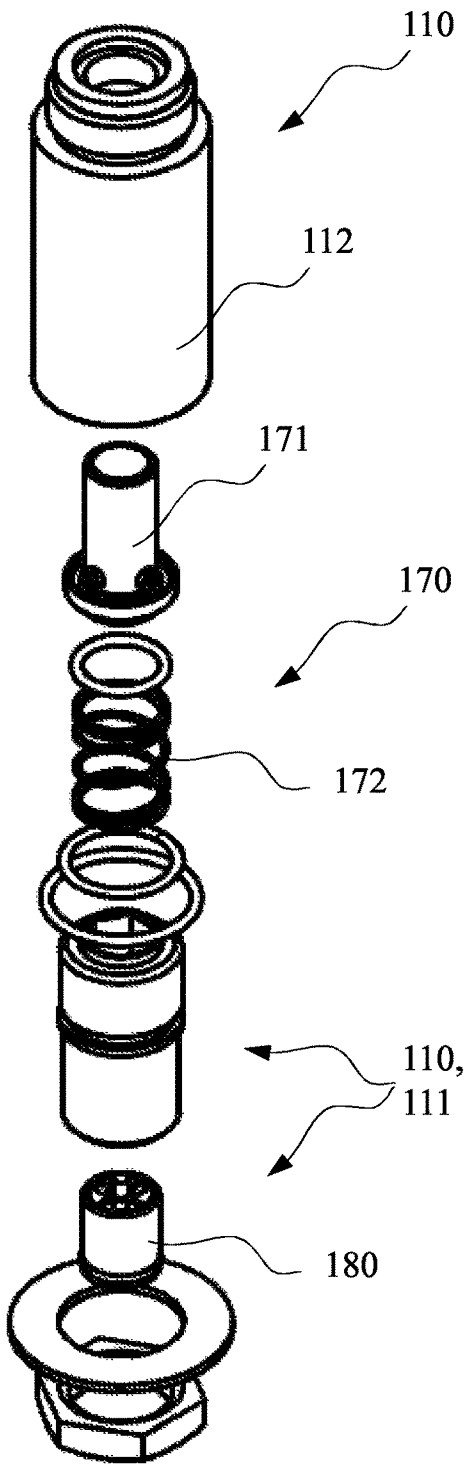
FIG. 4 shows an isometric exploded view of a base body and a sealing device.

FIG. 4 shows an isometric exploded view of a base body 110 and a sealing device 170. Base body 110 comprises a housing 112 which is hollow in order to conduct cleaning liquid through base body 110 to the valve (not shown). Connector 111 of base body 110 is accommodated on housing 112. Connector 111 is suitable for connecting a tube. Sealing device 170 is disposed in housing 112. The sealing device comprises a plug 171 which is moved vertically upwards by a blocking element 172 when the valve (not shown in FIG. 4) and/or the spray body (not shown in FIG. 4) is/are removed. Plug 171 seals base body 110 at the upper surface, such that cleaning liquid cannot exit base body 110 at this position after removal of the valve. Furthermore, a backflow preventer 180 is disposed in housing 112. Said backflow preventer 180 prevents cleaning liquid from flowing back through connector 111.

The invention claimed is:

1. A cleaning device (100) for a vessel, the cleaning device (100) comprising a base body (110), a valve (120), a spray body (130), a restoring device (140), a release mechanism (150) and an actuating element (160), the base body (110) comprising a connector (111), the valve (120) being disposed between the base body (110) and the spray body (130) and the valve (120) being openable by the release mechanism (150) against a restoring force applied by the restoring device (140), the actuating element (160) being disposed on the release mechanism (150) and the actuating element (160) comprising at least one leg (162), the leg (162) of the actuating element (160) forming a supporting surface (163) for a vessel and the spray body (130) comprising a spray head (131), the spray head (131) being disposed above the supporting surface (163) and at a distance from the supporting surface (163), wherein the restoring force is greater than the sum of the gravitational forces of the vessel, the release mechanism (150) and the actuating element (160).

2. The cleaning device (100) according to claim 1, wherein the restoring force applied by the restoring device (140) is adjustable.

3. The cleaning device (100) according to claim 1, wherein the restoring device (140) comprises at least one spring.

4. The cleaning device (100) according to claim 1, wherein the spray head (131) comprises openings (132), the openings (132) having a spraying direction and the spraying direction being oriented vertically, horizontally or at a slant between vertical and horizontal.

5. The cleaning device (100) according to claim 1, wherein the cleaning device (100) comprises at least two identical or different actuating elements (160) and that each actuating element (160) is detachably connectable to the release mechanism (150).

6. The cleaning device (100) according to claim 1, wherein the actuating element (160) has a stabilizing element (165).

7. The cleaning device (100) according to claim 6, wherein the stabilizing element (165) is annular.

8. The cleaning device (100) according to claim 1, wherein the leg (162) of the actuating element (160) comprises a rubber coating (164).

9. The cleaning device (100) according to claim 1, wherein the leg (162) of the actuating element (160) is oblong, at least partially curved, at least partially straight, round or flat.

10. The cleaning device (100) according to claim 1, wherein the leg (162) of the actuating element (160) has at least one elevation or at least one recess.

11. The cleaning device (100) according to claim 1, wherein the actuating element (160) comprises two to ten identical or different legs (162).

12. The cleaning device (100) according to claim 1, wherein the actuating element (160) has a hub (161) and in that the actuating element (160) is connectable to the release mechanism (150) by means of the hub (161).

13. The cleaning device (100) according to claim 1, wherein the base body (110) or the spray body (130) comprise(s) at least one guide rail (133) and in that the actuating element (160) is guidable in the guide rail (133).

14. The cleaning device (100) according to claim 1, wherein the cleaning device (100) comprises a sealing device (170) or a backflow preventer (180).

15. The cleaning device (100) according to claim 1, wherein the vessel is a glass, a drinking glass, a storage jar or a canning jar, a cup, a pitcher, a tumbler, a mixer container, a blender or a blender container, a liquidizer container, a shaker, a mixing bowl, a mixing beaker, a jug, a cookware, a pot, a pan, a roasting pan, a baking sheet, a baking dish, a casserole; a vase, a bowl, a dish, a box, a barrel, a bottle or a funnel.

16. The cleaning device (100) according to claim 1, wherein the vessel is made of glass, clay, ceramic, wood, bamboo, plant fibers, plastic, paper, cardboard, metal, copper, iron, aluminum or brass, steel, stainless steel, a compound or an alloy thereof.

* * * * *